United States Patent
Dolgin et al.

(10) Patent No.: US 10,048,073 B2
(45) Date of Patent: Aug. 14, 2018

(54) BEACON-BASED GEOLOCATION USING A LOW FREQUENCY ELECTROMAGNETIC FIELD

(75) Inventors: Benjamin Dolgin, Alexandria, VA (US); Clayton Davis, Springfield, VA (US); James C. Zellner, Centreville, VA (US); Steven Cotten, Dumfies, VA (US)

(73) Assignee: RAYTHEON COMPANY, Waltham, MA (US)

( * ) Notice: Subject to any disclaimer, the term of this patent is extended or adjusted under 35 U.S.C. 154(b) by 1332 days.

(21) Appl. No.: 13/290,574

(22) Filed: Nov. 7, 2011

(65) Prior Publication Data

US 2013/0116970 A1    May 9, 2013

(51) Int. Cl.
*G06F 19/00* (2018.01)
*G01C 21/00* (2006.01)
*G01V 3/10* (2006.01)

(52) U.S. Cl.
CPC ............... *G01C 21/00* (2013.01); *G01V 3/10* (2013.01)

(58) Field of Classification Search
CPC . G01R 33/02; G01R 33/0017; G01R 33/0005
USPC ................................................... 702/150, 152
See application file for complete search history.

(56) References Cited

U.S. PATENT DOCUMENTS

| | | | |
|---|---|---|---|
| 2008/0036652 A1* | 2/2008 | Shore et al. | 342/357.06 |
| 2009/0009410 A1 | 1/2009 | Dolgin et al. | |
| 2009/0079426 A1* | 3/2009 | Anderson | 324/301 |

* cited by examiner

*Primary Examiner* — Lisa Peters
(74) *Attorney, Agent, or Firm* — Cantor Colburn LLP

(57) ABSTRACT

A method of performing geolocation of receivers, transmitters, and conductive objects includes detecting, with one or more receivers, magnetic field signals generated by one or more transmitters, with each transmitter including two or more co-located coils that are electrically unstable and unbalanced, and that have a mechanically stable orientation with respect to one another. The magnetic field signals from each of the two or more co-located coils of each of the two or more transmitters are decomposed into individual magnetic field components. A set of invariant scalar values that are independent of orientation of one or more magnetic antennas associated with the one or more receivers are calculated from the individual magnetic field components, and the position of an object is determined using the set of invariant scalar values.

6 Claims, 4 Drawing Sheets

BEACON-BASED GEOLOCATION USING A LOW FREQUENCY ELECTROMAGNETIC FIELD

BACKGROUND

The present disclosure relates generally to navigation and geolocation and, more particularly, to beacon-based geolocation using a low frequency electromagnetic field, such as a ULF (ultra low frequency) or VLF (very low frequency) electromagnetic field.

Geological mapping and geophysical surveying on the Earth's surface are mature sciences with a history of technology enhancements that improved the fidelity of understanding of the Earth, above and beneath the surface. Yet, when conventional techniques are employed in an underground environment, geolocation has proven a challenge.

Conventional mapping and survey systems, such as a Global Positioning System (GPS), determine the location of objects using satellite signals. However, a longstanding problem exists with determining location of personnel and equipment within, for example, underground facilities without the use of surveying. To date, this problem has not been resolved because of the difficulty of signaling/communicating between the Earth's surface and underground facilities/caverns/mines and the complexity of electromagnetic propagation within the Earth.

Lower fidelity, VLF systems are currently in development to support communications for cave rescue operations. These systems only obtain a shallow depth position when the communication system is used underground. In addition, VLF communications systems are effective up to about 600 meters (m) and occasionally up to about 1200 m. The VLF systems are also used to locate underground transmitters at comparable depths. In controlled experiments, they have achieved an accuracy of 2% in horizontal position and only 5% in depth.

A typical manner of providing time base synchronization between a transmitter and receiver used for navigation purposes has been to either (1) provide a uniform time radio reference signal from an independent source (e.g., GPS or VLF signal) or (2) provide each transmitter and receiver with its own highly accurate and stable timing mechanism which are then mutually synchronized at the beginning of the period of interest. However, in underground environments, GPS and VLF signals are either unavailable or unreliable. Providing each device with its own stable time base may be expensive, cumbersome, and wasteful of limited available power supplies.

SUMMARY

In an exemplary embodiment, a method of performing geolocation includes detecting, with one or more receivers, magnetic field signals generated by one or more transmitters, with each transmitter including one or more co-located coils that are electrically unstable and unbalanced, but that have a mechanically stable orientation with respect to one another; decomposing the magnetic field signals from each of the two or more co-located coils of each of the two or more transmitters into individual magnetic field components; calculating, from the individual magnetic field components, a set of invariant scalar values that are independent of orientation of one or more magnetic antennas associated with the one or more receivers; and using the set of invariant scalar values, determining the position of an object.

In another embodiment, a geolocation system includes one or more receivers configured to detect magnetic field signals, and a processing device. The processing device is configured to: decompose the detected magnetic field signals into individual magnetic field components; calculate, from the individual magnetic field components, a set of invariant scalar values that are independent of orientation of one or more magnetic antennas associated with the one or more receivers; and using the set of invariant scalar values, determine the position of an object.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
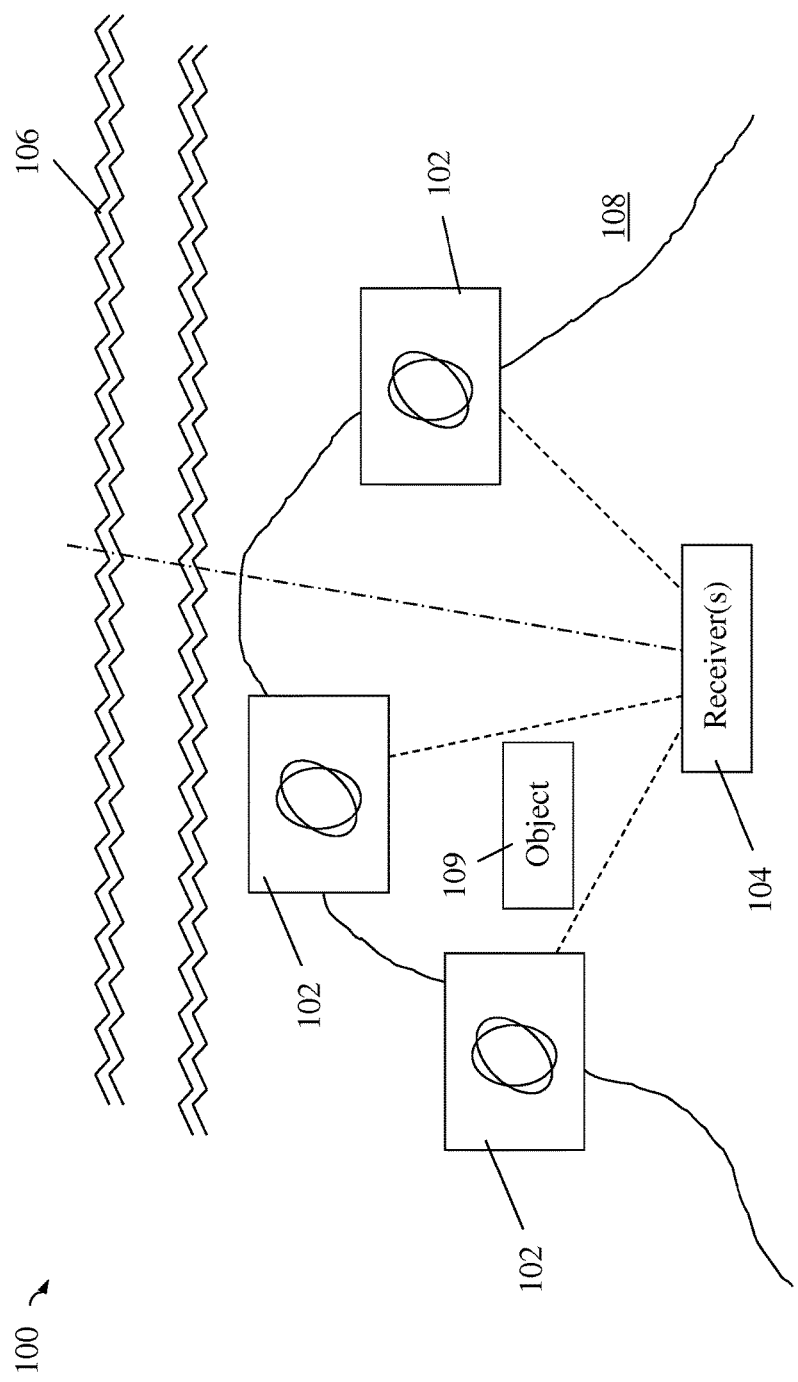
FIG. 1 is a schematic diagram of an exemplary positioning system architecture.

Subsurface geolocation has been demonstrated using magnetic beacons that emit ultra low frequency/very low frequency (ULFNLF) electromagnetic fields (e.g., about 100 Hz to about 20 kHz) that are equivalent to multiple precessing magnetic dipoles with fixed plane of precession. While precessing magnetic dipoles are easier to implement than a conventional stable ULF/VLF source, they still require controlling performance of individual coils that comprise the beacons. On the other hand, previous attempts at using ULF/VLF sources for navigation and subsurface scanning have proved difficult because sufficiently stable beacons are not presently available. In this sense, the term "stable" refers to electromagnetic coils that are "electrically" stable with respect to the amplitudes of the magnetic fields generated thereby. In addition, propagation of the coil signals through ground attenuates the source and makes conventional geolocation highly inaccurate.

Recently, there has been proposed and demonstrated a geolocation system and corresponding algorithm that does not require absolute electrical stability of the source/beacon, but only relative stability of the individual coils that comprise the beacon. In this regard, U.S. Patent Application Publication 2008/0036652 of Shore, et al. (assigned to the assignee of the present application and incorporated herein by reference in its entirety) discloses such an approach. In the present disclosure, however, even the requirement of relative stability of conductive coils that comprise a source/beacon is eliminated.

More specifically, an embodiment includes a novel geolocation system and corresponding algorithm that utilizes sources/beacons each having multiple coils (e.g., 2 or 3 coils) that are mechanically stable (i.e., maintain a physical orientation) but also electrically variable with respect to one another. In an exemplary embodiment, each of the coils is actuated by an independent ULF/VLF source that is neither synchronized with any other source nor is the amplitude thereof controlled by a common controller. Rather, each signal generated by a given coil contains a characteristic (e.g., frequency) that is different from that of the other coils. As described in further detail hereinafter, an algorithm embodiment advantageously uses the fact that, in ULF/VLF, the propagated signal is linear. Thus, at any location, each coil of the beacon will produce a field that changes in amplitude but not in orientation. Because a plane formed by two orientations of two fields produced by two coils depends only on the line of bearing (LOB) to the source, and not on the characteristics of the actual signal, an embodiment therefore may use this LOB-related information for geolocation. Although the exemplary embodiments described herein are in the context of ULF/VLF sources, it is contemplated that magnetic field signals employed herein may be generated at a frequency of about 10 kHz or less.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature(s) being described. Also, the description is not to be considered as limiting the scope of the embodiments described herein.

Referring initially to FIG. 1, there is shown a positioning system 100 suitable for use in accordance with exemplary embodiments. As is shown, the positioning system 100 features a number of components, which may include a plurality of transmitters 102 (as used herein, the terms "transmitter" and "beacon" are interchangeable) and one or more receiver units 104 (hereinafter "receiver"). Additional signals of opportunity 106, such as from other transmitters in the very low/low/medium frequency range and AM radio signals, may also be exploited as additional signal sources, as will be explained further below. In one embodiment, the transmitters 102 may be disposed above a ground surface 108, while the receiver may be disposed below the ground surface 108. However, the locations of the transmitters 102 and receiver 104 with respect to the ground surface 108 may vary. An object 109 of interest, such as a magnetic or electrically conductive object (e.g., drilling bits or other underground structures), may also be the subject of geolocation where the object 109 is in proximity to the transmitters 102 and receiver(s) 104 and the location of the transmitters 102 and receiver(s) 104 is known.

Figure 2:
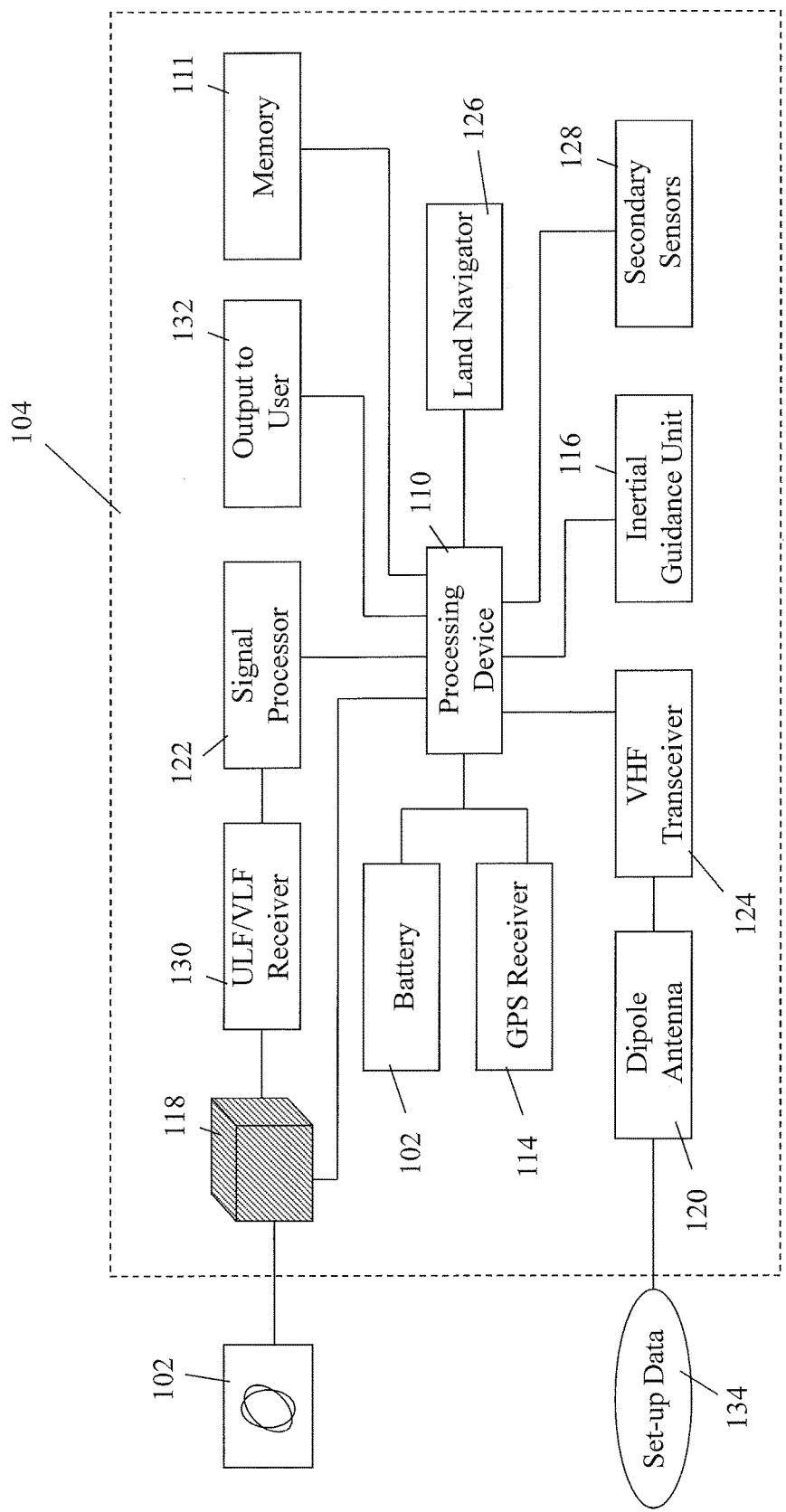
FIG. 2 is a schematic block diagram of a receiver as depicted in FIG. 1.

In further detail, FIG. 2 is a block diagram illustrating exemplary components of the receiver 104, which is, for example, a sensitive, multi-component magnetic receiver capable of accurately detecting the magnetic field vectors emanating from the transmitters 102. More specifically, the receiver 104 may include a processing device 110 with associated memory 111, a power source 112 (e.g., a battery), a GPS receiver 114, an inertial guidance unit 116, a magnetic antenna 118, a dipole antenna 120, a signal processor 122, a VHF transceiver 124, a land navigator system 126, and additional secondary sensors 128 (e.g., magnetic compass, accelerometers, tiltmeters, microbarometer, etc.).

The processing device 110 processes data received by a multiple channel (e.g., three-channel) ULF/VLF receiver 130, the dipole antenna 120, and secondary sensors 128 to provide a three-dimensional location of the receiver 104, either below or above ground. The inclusion of the GPS receiver 114 allows the receiver 104 to interface with an existing GPS-based land navigation unit (not shown) and provide full integration with surface geographic information systems and databases. Output 132 from the processing device 110 may be accordingly configured so that existing land navigation options for display and user interface are preserved, and underground locations obtained from the positioning system 100 smoothly transition from GPS locations determined during those times that the receiver 104 is above the Earth's surface. Location and orientation of the transmitters 102 may be passed to the receiver 104 as set-up data 134 prior to the receiver 104 going underground.

In addition to storing reference locations of each of the transmitters 102, the processing device 100 may also store any surveyed information regarding the signals of opportunity 106 (from FIG. 1). This data may be used in estimating the current position of the user. GPS locations of the entry points are used to provide the "truth" for the starting positions. The outputs from the microbarometer (part of secondary sensors 128) of the receiver 104 can also be used to provide incremental update and error correction for elevation estimates. Using this data, the computed location can be continually updated on the display output 132.

As stated above, the magnetic fields induced by the transmitters 102 are detected by the magnetic antenna 118 of the receiver 104. In one embodiment, an exemplary magnetic antenna 118 for use with the receiver 104 is the Raytheon Cube sensor, a triaxial air coil magnetic receiver. The processing unit 110 uses the VLF receiver 130 and signal processor 122 to calculate the azimuth and inclination of vector magnetic fields induced by the transmitters 102. Using the known locations of the transmitters 102 and azimuths to distant transmitters 102, the processing unit 110 determines the location of the receiver 104 on a continuous basis as the receiver 104 is moved within the underground space.

Figure 3B:
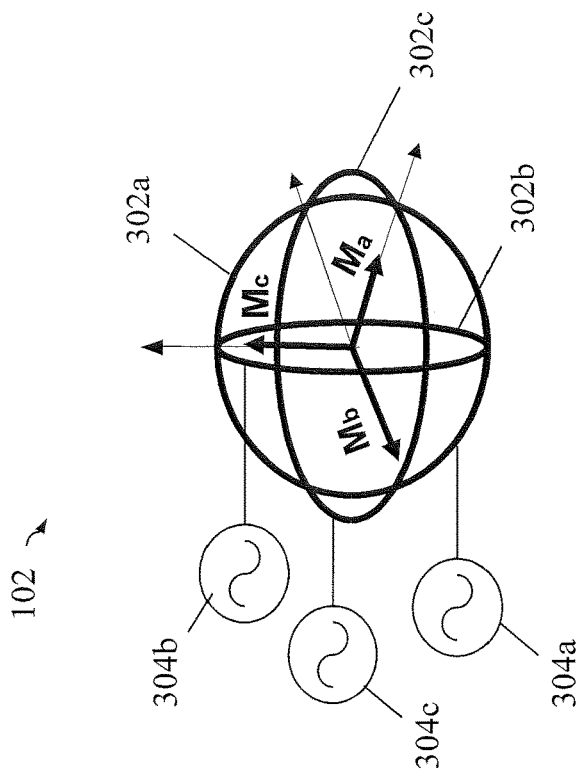
FIG. 3(b) is a schematic diagram of an exemplary embodiment of a beacon or transmitter having three co-located coils.
Figure 3A:
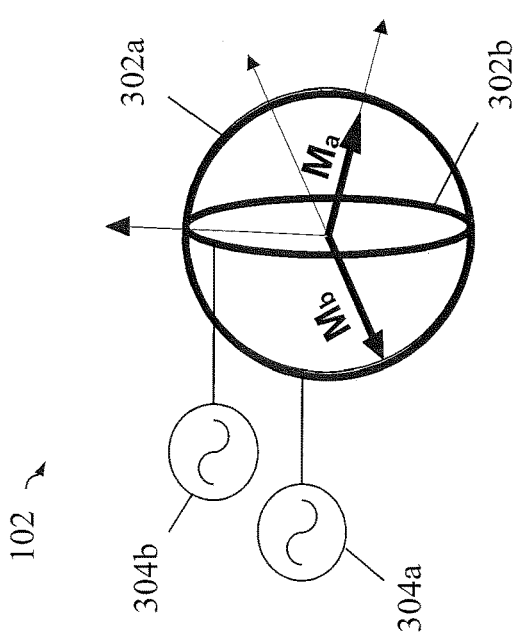
FIG. 3(a) is a schematic diagram of an exemplary embodiment of a beacon or transmitter having two co-located coils.

Navigation in underground environments is possible using an embodiment of the system 100 having two or more transmitters 102 each having two or more co-located coils positioned around a same point, as shown in the schematic diagrams of FIGS. 3(a) and 3(b). In the embodiment of FIG. 3(a), the transmitter 102 has a first coil 302a and a second coil 302b that are co-located with respect to one another. Both coils 302a and 302b are supplied with independent power supplies, 304a, 304b, respectively, that actuate the coils. In the embodiment of FIG. 3(b), a third coil 302c and associated independent power source 304c is added to the transmitter 102. With either embodiment, the magnitude and 3D direction of magnetic field as a function of time are measured by the receiver 104.

In lieu of a specific, custom made transmitter device 102 such as those depicted in FIGS. 1-3, several other types of devices that behave like co-located coils may also be used as transmitters or beacons including, for example electrical motors, electrical generators, transformers, spinning machinery, and electrical coils located near large conductive or magnetic objects. It is contemplated that any of these, or other similar objects, may be used as a source for (or a subject of) geolocation. In the specific example of locating a receiver, it is contemplated that at least two transmitters with known properties and locations may be used, and more specifically at least three transmitters. In the specific example of locating a transmitter, a motor or a generator, it is contemplated that at least two receivers with known locations may be used, and more specifically at least three receivers. If the transmitter to be located is stationary, a single receiver moving along a known trajectory may be used, as such may act as an infinite number of receivers. In the case of locating a conductive or magnetic object, it is contemplated that (i) at least two transmitters and one receiver or (ii) one transmitter and two receivers may be used (i.e., a total of at least three components). More specifically, at least four objects may be used, with at least one being a transmitter and at least one being a receiver. If more than one receiver is used, the receivers should be able to exchange information with one another.

In quasi-static approximation, the magnetic field $\vec{B}$ generated by an electrical coil may be given by the expression:

$$\vec{B} = \frac{\mu_0}{4\pi}\left[\frac{3\hat{r}(\vec{M}\cdot\hat{r})}{r^5} - \frac{\vec{M}}{r^3}\right] = \frac{\mu_0 M}{4\pi r^3}[3\hat{r}(\hat{m}\cdot\hat{r}) - \hat{m}] \quad \text{(Eq. 1)}$$

where $$\vec{M}_i = M_i \cdot \hat{m}_i \quad \text{(Eq. 2)}$$

is magnetic moment of the coil $$\vec{r} = r \cdot \hat{r} \quad \text{(Eq. 3)}$$

where the unitary vector $\hat{r}$ is line of bearing (LOB)

The value of $M_i$ is approximately equal to the number of turns, the area of the coils and the current carried by the coils. The orientation of the unitary vector $\hat{m}$ is roughly perpendicular to the area of the coil.

The orientation of the vector $\vec{B}_i$ is independent of $M_i$; the latter can be an arbitrary function of time.

In the ULF and VLF frequency bands, the validity of Eq. 1 is limited to distances of several hundred meters. The distance is determined by the proximity of the transmitter to the ground and ground conductivity.

For any two transmitting co-located coils (k, l), transmission plane orientation may be defined as:

$$\hat{u} = \frac{\hat{m}_k \times \hat{m}_l}{|\hat{m}_k \times \hat{m}_l|} \quad \text{(Eq. 4)}$$

The magnetic fields $B_1^i$ and $B_2^i$ of a first coil and a second coil co-located with the first coil, for a given transmitter, i, that are generated at a given point also define a LOB dependent plane according to the expression:

$$\hat{n}_i = \frac{\vec{B}_1^i \times \vec{B}_2^i}{|\vec{B}_1^i \times \vec{B}_2^i|} \quad \text{(Eq. 5)}$$

Since $B_1^i$ and $B_2^i$ can be measured independently, the value of n is a physically measurable quantity.

It can be shown that the following two relationships are true:

$$\begin{cases} \hat{u}_i \cdot \hat{n}_i = \dfrac{3(\hat{r}_i \cdot \hat{u}_i)^2 - 2}{\sqrt{4 - 3(\hat{r}_i \cdot \hat{u}_i)^2}} \\ (\hat{u}_i \times \hat{n}_i) \cdot \hat{r}_i = 0 \end{cases} \quad \text{(Eq. 6)}$$

Eq. 6 correlates LOB with orientations of planes of received and transmitted signals. The equation does not include any terms related to actual distance between a receiver and a transmitter, nor does it include any terms related to the physical shape of the signals transmitted by the two coils. As long as the coils are mechanically stable (i.e., $\hat{m}$ is stable), Eq. 6 holds.

Figure 4:
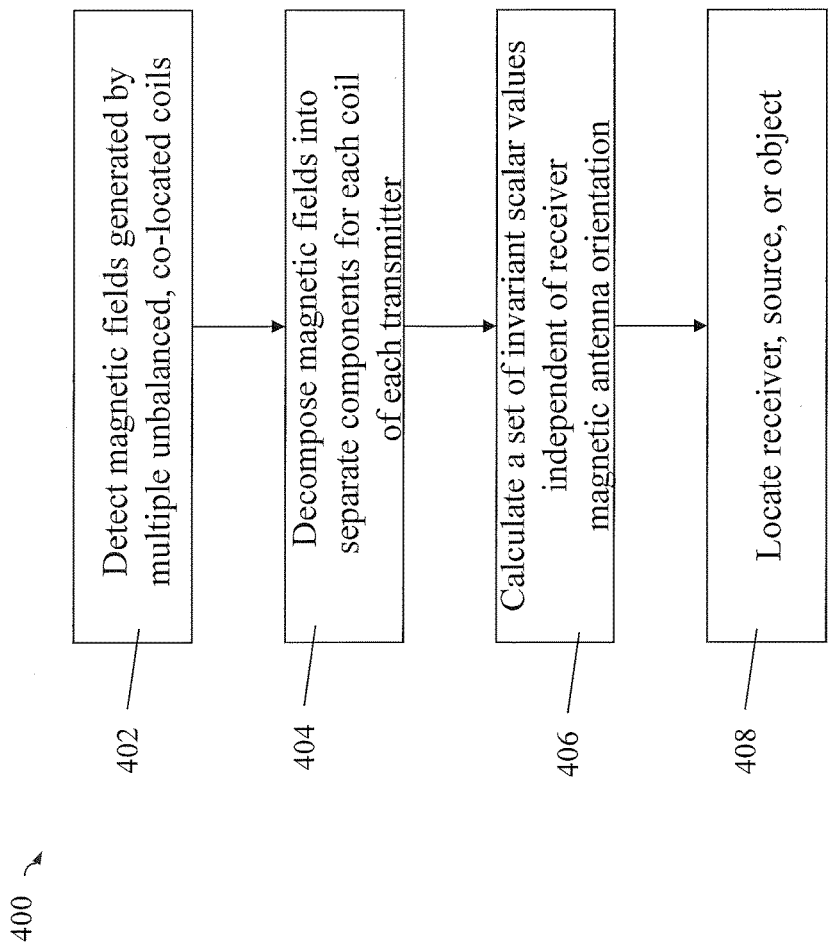
FIG. 4 is a flow diagram illustrating a method of performing beacon-based geolocation using ULF/VHF electromagnetic fields, in accordance with an exemplary embodiment.

In view of this, FIG. 4 is a flow diagram illustrating a method 400 of performing beacon-based geolocation using ULF/VLF electromagnetic fields, in accordance with an exemplary embodiment. Depending on the knowledge of position and orientation of several co-located coils, and receivers, the geolocation method herein may be used to locate the position of any of a receiver, a source or a magnetic/conductive object within the proximity of transmitters/receivers. More specifically, the method may be used for (at least) any of the following functions:

(1) Geolocation of a receiver if positions and orientation of several co-located coils are known;

(2) Geolocation of a source with co-located coils if location of several receivers are known;

(3) Geolocation of a stationary source comprising co-located coils if either locations of several receivers are known, or a single receiver moves along a known trajectory, or a combination of the above;

(4) Geolocation of a stationary receiver when the source comprising co-located coils is moving along a known trajectory;

(5) Geolocation of a magnetic object that is placed within proximity of several co-located coil transmitters and several receivers with known coordinates; and (6) Geolocation of an electrically conductive object that is placed within proximity of several co-located coil transmitters and several receivers with known coordinates.

Whereas previous techniques have utilized Eq. 6 for geolocation by implementing specific excitation schemes for the co-located coils to define the value of $\hat{n}$, the present embodiments recognize that the value of $\hat{n}$ may be defined by using Eq. 5 and thereafter applied to Eq. 6.

Referring again to FIG. 4, as shown in block 402, the method 400 begins by detecting and measuring (such as using one or more receivers 104 discussed above) magnetic fields generated by multiple (i.e., two or more) transmitters each having two or more co-located coils of a known orientation. That is, the transmitters are mechanically (geometrically) stable. However, each coil of each transmitter is electrically unstable in amplitude and unbalanced with respect to one another.

Once these fields are detected, in block 404 the magnetic fields are decomposed into separate components for each coil of each transmitter. From these components, a set of invariant scalar values (also known in the art as scalar invariants) that are independent of receiver (magnetic antenna 118) orientation are then calculated, as shown in block 406 of FIG. 4. Examples of such invariants include:

$$\hat{u} \cdot \hat{v}$$

$$\hat{u} \cdot (\hat{v} \times \hat{r})$$

...

These invariant scalar values may be computed by any suitable technique known in the art. Equations 5 and 6 described above are examples of such scalar invariants. The determination of a plane formed by two orientations of two fields produced by two coils depends on the LOB and not the characteristics of the actual signals. Calculating invariant scalar values may further include determining:

$$\hat{n}_i \cdot \hat{n}_j = \frac{\vec{B}_1^i \times \vec{B}_2^i}{|\vec{B}_1^i \times \vec{B}_2^i|} \cdot \frac{\vec{B}_1^j \times \vec{B}_2^j}{|\vec{B}_1^j \times \vec{B}_2^j|} \quad \text{(Eq. 7)}$$

wherein $\hat{n}_i$ and $\hat{n}_j$ are the LOB dependent planes associated with pairs of coils of the transmitter i and another transmitter, j. In turn, as shown in block 408, LOB data may then be used to determine by geolocation, the position of any one of a receiver, a source or a stationary conductive/magnetic object probed by a moving receiver/source.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method of performing geolocation of an object, the method comprising:
   detecting, with one or more receivers, magnetic field signals generated by one or more transmitters, with each transmitter comprising two or more coils that are mechanically stable with respect to one another, are positioned around a same point and are electrically variable with respect to each other, wherein each of the two or more coils generates a signal with a different frequency than others of the two or more coils and the coils do not include a common controller, the frequencies being in the ultra-low frequency (ULF) or very-low frequency (VLF) range;
   decomposing the magnetic field signals from each of the coils of each of the two or more transmitters into individual magnetic field components for each coil of each transmitter;
   calculating, from the individual magnetic field components, a set of invariant scalar values that are independent of orientation of one or more magnetic antennas associated with the one or more receivers;
   using the set of invariant scalar values, determining a geographic position of the object by:
   determining a line of bearing (LOB) to each of the one or more transmitters based on an analysis of the set of invariant scalar values, the set of invariant scalar values being derived from a total, n, of magnetic field signals generated by the two or more coils of each of the one or more transmitters, and wherein n corresponds to, for each transmitter, the number of co-located coils;
   determining, for a given transmitter, i, an LOB dependent plane, $\hat{n}_i$, based on the magnetic field signals generated by the first and second coils in accordance with the expression:

$$\hat{n}_i = \frac{\vec{B}_1^{\omega^i} \times \vec{B}_2^{\omega^i}}{|\vec{B}_1^{\omega^i} \times \vec{B}_2^{\omega^i}|};$$

wherein $B_1^i$ and $B_2^i$ are the magnetic fields, respectively, of the two coils of the first coil and second coil of the transmitter i;
wherein a given individual coil (k) is characterized by a single a geometrical parameter comprising its orientation, $\hat{m}_k$; and
wherein a given pair of coils (k, l) is characterized by a transmission plane orientation in accordance with the expression:

$$\hat{u} = \frac{\hat{m}_k \times \hat{m}_l}{|\hat{m}_k \times \hat{m}_l|};$$

wherein $\hat{m}_k$ and $\hat{m}_l$ are unitary vectors roughly perpendicular to respective areas of the pair of coils (k, l); and
outputting a global positioning system location of the object to a user over an output display based on the determined geographic position of the object.

2. The method of claim 1, further comprising correlating LOB, $\hat{r}_i$, for the transmitter i, with transmission plane orientation, $\hat{u}_i$, for the first and second coils of the transmitter i in accordance with the expressions:

$$\begin{cases} \hat{u}_i \cdot \hat{n}_i = \frac{3(\hat{r}_i \cdot \hat{u}_i)^2 - 2}{\sqrt{4 - 3(\hat{r}_i \cdot \hat{u}_i)^2}} \\ (\hat{u}_i \times \hat{n}_i) \cdot \hat{r}_i = 0. \end{cases}$$

3. The method of claim 1, wherein calculating the set of invariant scalar values further comprises calculating:

$$\hat{n}_i \cdot \hat{n}_j = \frac{\vec{B}_1^{\omega^i} \times \vec{B}_2^{\omega^i}}{|\vec{B}_1^{\omega^i} \times \vec{B}_2^{\omega^i}|} \cdot \frac{\vec{B}_1^{\omega^j} \times \vec{B}_2^{\omega^j}}{|\vec{B}_1^{\omega^j} \times \vec{B}_2^{\omega^j}|}$$

wherein $\hat{n}_i$ and $\hat{n}_j$ are the LOB dependent planes associated with pairs of coils of the transmitter i and another transmitter, j.

4. A geolocation system, comprising:
   one or more receivers configured to detect magnetic field signals, the magnetic signal generated by one or more transmitters, each comprising two or more coils, that are electrically variable with respect to each other, and that have a mechanically stable orientation with respect to one another, wherein each of the two or more coils generates a signal with a different frequency than others of the two or more coils and the coils do not include a common controller, the frequencies being in the ultra-low frequency (ULF) or very-low frequency (VLF) range; and
   a processing device configured to:
   decompose the detected magnetic field signals into individual magnetic field components for each coil of each transmitter;
   calculate, from the individual magnetic field components, a set of invariant scalar values that are independent of orientation of one or more magnetic antennas associated with the one or more receivers; and using the set of invariant scalar values, determine a geographic position of an object by:

determining a line of bearing (LOB) to each of the two or more transmitters based on an analysis of the set of invariant scalar values, the set of invariant scalar values being derived from a total, n, of magnetic field signals generated by the two or more coils of each of the two or more transmitters, and wherein n corresponds to, for each transmitter, the number of coils;

determining, for a given transmitter, i, having a first coil and a second coil, an LOB dependent plane, $\hat{n}_i$, based on the magnetic field signals generated by the first and second coils in accordance with the expression:

$$\hat{n}_i = \frac{B_1^{\omega^i} \times B_2^{\omega^i}}{|B_1^{\omega^i} \times B_2^{\omega^i}|};$$

wherein $B_1^i$ and $B_2^i$ are the magnetic fields, respectively, of the first coil and second coil of the transmitter i;

wherein a given individual coil (k) is characterized by a single a geometrical parameter comprising its orientation, $\hat{m}_k$; and wherein a given pair of coils (k, l) is characterized by a transmission plane orientation in accordance with the expression $$\hat{u} = \frac{\hat{m}_k \times \hat{m}_l}{|\hat{m}_k \times \hat{m}_l|};$$

wherein $\hat{m}_k$ and $\hat{m}_l$ are unitary vectors roughly perpendicular to respective areas of the pair of coils (k, l); and outputting a global positioning system location of the object to a user over an output display based on the determined geographic position of the object.

5. The system of claim 4, wherein the processing device is further configured to correlate LOB, $\hat{r}_i$, for the transmitter i, with transmission plane orientation, $\hat{u}_i$, for the first and second coils of the transmitter i in accordance with the expressions:

$$\begin{cases} \hat{u}_i \cdot \hat{n}_i = \dfrac{3(\hat{r}_i \cdot \hat{u}_i)^2 - 2}{\sqrt{4 - 3(\hat{r}_i \cdot \hat{u}_i)^2}} \\ (\hat{u}_i \times \hat{n}_i) \cdot \hat{r}_i = 0. \end{cases}$$

6. The system of claim 4, wherein calculating the set of invariant scalar values further comprises calculating:

$$\hat{n}_i \cdot \hat{n}_j = \frac{B_1^{\omega^i} \times B_2^{\omega^i}}{|B_1^{\omega^i} \times B_2^{\omega^i}|} \cdot \frac{B_1^{\omega^j} \times B_2^{\omega^j}}{|B_1^{\omega^j} \times B_2^{\omega^j}|}$$

wherein $\hat{n}_i$ and $\hat{n}_j$ are the LOB dependent planes associated with pairs of coils of the transmitter i and another transmitter, j.

* * * * *